(12) United States Patent
Marty et al.

(10) Patent No.: US 11,347,610 B2
(45) Date of Patent: May 31, 2022

(54) METHOD AND SYSTEM FOR ASSISTING TROUBLESHOOTING OF A COMPLEX SYSTEM

(71) Applicants: AIRBUS DEFENCE AND SPACE SAS, Toulouse (FR); AIRBUS, Blagnac (FR)

(72) Inventors: Jean-Luc Marty, Toulouse (FR); David Canu, Toulouse (FR); Alexandre Arnold, Toulouse (FR)

(73) Assignees: AIRBUS DEFENCE AND SPACE SAS, Toulouse (FR); AIRBUS, Blagnac (FR)

( * ) Notice: Subject to any disclaimer, the term of this patent is extended or adjusted under 35 U.S.C. 154(b) by 162 days.

(21) Appl. No.: 16/956,850

(22) PCT Filed: Dec. 20, 2018

(86) PCT No.: PCT/FR2018/053454
§ 371 (c)(1),
(2) Date: Jul. 20, 2020

(87) PCT Pub. No.: WO2019/122747
PCT Pub. Date: Jun. 27, 2019

(65) Prior Publication Data
US 2021/0081289 A1  Mar. 18, 2021

(30) Foreign Application Priority Data

Dec. 22, 2017  (FR) ..................................... 17 62945

(51) Int. Cl.
*G06F 11/22* (2006.01)
*G06F 11/00* (2006.01)

(52) U.S. Cl.
CPC ........ *G06F 11/2257* (2013.01); *G06F 11/008* (2013.01)

(58) Field of Classification Search
CPC ... G06F 11/008; G06F 11/079; G06F 11/2257
See application file for complete search history.

(56) References Cited

U.S. PATENT DOCUMENTS

| 8,762,321 B2 * | 6/2014 | Joanni ................... G06N 7/005 706/59 |
| 2017/0312614 A1 | 11/2017 | Tran et al. |
| 2017/0323481 A1 | 11/2017 | Tran et al. |

FOREIGN PATENT DOCUMENTS

WO  WO-2018103842 A1 * 6/2018 ............. G06F 30/33

OTHER PUBLICATIONS

Miessler, D.; "The Difference Between Ex-Ante, Post Hoc, Ex Post, A Priori, and A Posteriori;" retrieved from the Internet on Jan. 24, 2022; created / updated on Jul. 11, 2018.*

(Continued)

*Primary Examiner* — Joseph R Kudirka
(74) *Attorney, Agent, or Firm* — Nixon & Vanderhye P.C.

(57) ABSTRACT

A system and a method for assisting with troubleshooting a complex system is disclosed in which the troubleshooting procedure can be modeled by a Markov decision process. Combining the fault tree technique with a Markov decision process, in order to determine in an optimal manner the sequence of troubleshooting actions will quickly address the consequences of a failure and ensure maintainability of the complex system.

12 Claims, 3 Drawing Sheets

(56) References Cited

OTHER PUBLICATIONS

Bouissou, M.; "Boolean Logic Driven Markov Processes: A Powerful New Formalism for Specifying and Solving Very Large Markov Models;" PSAM6, Puerto Rico; Jun. 23, 2002.*

Steven J. Henderson, et al., "Augmented Reality for Maintenance and Repair (ARMAR)", Internet Citation, <URL:http://graphics.cs.columbia.edu/projects/armar/pubs/henderson_feiner_AFRL_RH-WPTR-2007-0112.pdf> 70 pages, Aug. 1, 2007.

French Search Report and Written Opinion for FR Application No. 1762945 dated Aug. 17, 2018, 10 pages.

English Translation of International Search Report for PCT/FR2018/053454 dated Apr. 18, 2019, 3 pages.

French Written Opinion of the ISA for PCT/FR2018/053454 dated Apr. 18, 2019, 8 pages.

* cited by examiner

METHOD AND SYSTEM FOR ASSISTING TROUBLESHOOTING OF A COMPLEX SYSTEM

CROSS REFERENCE TO RELATED APPLICATIONS

The present application is a National Phase of International Application Number PCT/FR2018/053454 filed Dec. 20, 2018, which designated the U.S. and claims priority benefits from French Patent Application No. FR 17 62945 filed Dec. 22, 2017, the entire contents of each of which are hereby incorporated by reference.

TECHNICAL FIELD

The present invention relates to the field of troubleshooting elements of complex systems. More specifically, it relates to a method and a system for assisting with troubleshooting of a complex system.

PRIOR ART

A complex system generally comprises a plurality of elements linked together by numerous interconnections. These elements may for example be mechanical, electronic components and/or software components. Such complex systems exist in a wide variety of business sectors, for example such as industry, automotive, railroads, or aviation. These complex systems potentially pose problems for a maintenance operator in locating a failure observed for example by a user of such a system, in other words in determining the non-working element or elements which lie at the origin of this failure.

These complex systems generally have diagnostic tests or testing for proper operation which are intended to detect and locate failures. Some tests are based on the fault tree technique which uses a tree decomposition of the complex system. This technique makes it possible to determine the minimum combinations of events which lead to loss of the main function of the complex system, such as a malfunction or accident.

The fault tree technique makes it possible to evaluate the likelihood of the occurrence of the unwanted event based on combinations of elementary events which can produce it. By knowing the probabilities of these elementary events, we can thus deduce the probability of the unwanted event and the impact on it of a reduction (or increase) in such probabilities of the elementary events. The probabilities of the elementary events are then used to identify the non-working element(s) of the complex system which lie at the origin of the failure.

It is common that in a complex system, a failure can have multiple or different potential causes. Often these potential causes cannot be tested automatically. In this case, a maintenance operator must be dispatched and a troubleshooting assistance procedure must be implemented.

To date, such a troubleshooting assistance procedure for a complex system, based on elementary probabilities from a fault tree, is not satisfactory. Indeed, nothing enables a maintenance operator to isolate a particular failure to be tested among all considered failures. In this case, the maintenance operator may have to spend more time than necessary to troubleshoot the complex system and thus delay the return of the complex system to the normal operating state.

SUMMARY OF THE INVENTION

The present invention therefore aims to overcome such disadvantages by providing a method and system for assisting with troubleshooting a complex system.

A first object of the invention relates to a method for assisting with troubleshooting a complex system comprising a plurality of entities connected to each other, the complex system being modeled by a fault tree defining some or all of the combinations of events causing a top event associated with a failure of the complex system, the fault tree comprising a plurality of intermediate events and a plurality of basic events. The method comprises:

assigning an ex-ante probability of occurrence value to each of the basic events of the fault tree, in order to generate an augmented fault tree, assigning failure information to each of the basic events and each of the intermediate events of the augmented fault tree which are associated with an entity under automatic monitoring, the failure information describing an observation of the operating state of the entity associated with the event of the augmented fault tree, calculating an ex-post probability of occurrence value for each of the events of the augmented fault tree, based on the assigned a priori probability of occurrence values and the assigned failure information, assigning a troubleshooting cost to each of the events of the augmented fault tree which are associated with an entity not under automatic monitoring and serviceable, the troubleshooting cost defining the difficulty for the maintenance operator in identifying the failure of the entity associated with the event of the augmented fault tree, modeling, by a Markov decision process (MDP) based on the augmented fault tree, one or more possible evolutions of the complex system in response to at least one troubleshooting action by the maintenance operator on at least one entity, the troubleshooting action corresponding to a procedure for identifying the failure or confirming the proper operation of the entity, determining an optimal sequence of troubleshooting actions for the complex system, according to a decision policy which minimizes the expected value of the sum of the troubleshooting costs and which is determined by applying an MDP-solving algorithm.

In the method, the step of calculating an ex-post probability of occurrence value may comprise the steps of:

constructing a Bayesian network from the augmented fault tree, the Bayesian network being provided for making predictions concerning relationships between events of the augmented fault tree based on failure information and a priori probability values, and calculating the probability value from the Bayesian network.

In addition, the nodes of the Bayesian network represent corresponding entities of the complex system, the arcs between nodes being associated with distributions of conditional probabilities which represent probabilities of events associated with certain entities of the complex system which are associated with events associated with other entities of the complex system.

In the method, the step of assigning a troubleshooting cost may comprise the step of:

obtaining the troubleshooting cost based on a cost function dependent on at least one term which corresponds to a measurement or an estimate of the difficulty for the maintenance operator in identifying the failure of the entity.

In the method, the step of modeling by an MDP may comprise the step of defining an MDP with a finite horizon described by a quadruplet {S,A,T,R} in which:

S is a set defining the states in which the complex system can be found at time t starting from an initial state of the complex system, A is a set defining the troubleshooting actions that can be performed as a function of the state of the complex system and which influence the evolution of the current state of the complex system, T is a transition function defining the set of probabilities of transitioning between two states of the complex system at states t and t+1, in response to the troubleshooting actions of set A, R is a reward function defining the set of troubleshooting costs associated with the troubleshooting actions of set A.

In addition, when T defines the set of failure probabilities, a terminal state of the MDP is reached when at least one failure probability of a basic event is equal to 1.

Furthermore, when T defines the set of failure probabilities, a terminal state of the MDP is reached when the set of failure probabilities is equal to 0.

Finally, when T defines the set of failure probabilities, a terminal state of the MDP is reached when all the serviceable nodes of the complex system have a failure probability equal to 0 or 1.

A second object of the invention relates to a computer program product comprising instructions which, when executed by a processor, implement or control steps of a method according to the first object of the invention.

A third object of the invention relates to a system for assisting with troubleshooting a complex system comprising a plurality of entities connected to each other, the complex system being modeled by a fault tree defining some or all of the combinations of events causing a top event associated with a failure of the complex system, the fault tree comprising a plurality of intermediate events and a plurality of basic events, the system comprising a troubleshooting assistance server and an electronic device both of which are arranged for accessing a communication network:

the troubleshooting assistance server comprises a first processor configured to at least partly execute a method according to the first object of the invention, the portable electronic device comprises a second processor coupled to a user input device and to a display device, in which the second processor is configured for:

receiving all or part of the optimal sequence of troubleshooting actions for the complex system, via the communication network, displaying on the display device an image representative of the current troubleshooting action to be performed, based on the optimal sequence of troubleshooting actions for the complex system, detecting an input signal from the user input device, which is representative of a user input during the displaying of the image representative of the current troubleshooting action to be performed, in response to a user input which is indicative of detection of a failure or confirmation of the proper operation of the entity associated with the current troubleshooting action to be performed, displaying on the display device an image representative of the next troubleshooting action to be performed, based on the optimal sequence of troubleshooting actions for the complex system.

In the system:

the second processor of the portable electronic device is further configured for sending the user input to the first processor of the troubleshooting assistance server, in response to receiving the user input, the first processor is further configured for:

determining the next troubleshooting action from the optimal sequence of troubleshooting actions for the complex system, and sending the next troubleshooting action, from the optimal sequence of troubleshooting actions for the complex system to the second processor of the portable electronic device.

In addition, the user input device may be comprised in the display device.

BRIEF DESCRIPTION OF DRAWINGS

Other features and advantages of the invention will be better understood by reading the following description and referring to the accompanying drawings, given by way of illustration and in no way limiting.

For clarity, unless otherwise stated the elements shown are not to scale relative to each other.

DESCRIPTION OF EMBODIMENTS

In the description, the term "complex system" means a system (or device or object) consisting of a large number of entities, whether electrical, electronic, software, mechanical, and combinations thereof, which are interconnected. It may for example and without limitation be a motor vehicle, an aircraft, a nuclear power plant, a satellite system, or even any computer system. In addition, it is assumed that the complex system is modeled by a fault tree defining some or all of the combinations of events causing a top event associated with a failure of the complex system. In this context, the fault tree comprises a plurality of intermediate events and a plurality of basic events.

The general principle of the invention starts with the fact that the troubleshooting procedures are carried out on unmonitored entities of a complex system. Unmonitored means that a maintenance operator of a complex system does not have any information concerning the operating status of the entities to troubleshoot. It is therefore very difficult for the operator to address the consequences of a failure quickly and ensure maintainability of the complex system. Maintainability is generally defined as the ability of an asset to be maintained or restored to a state where it can perform a required function. And this is achieved, when maintenance is carried out under given conditions, using advised procedures and means.

A maintenance operator is thus often required to test the potentially faulty entities of the complex system one by one, in an arbitrary order. In this process, the maintenance operator therefore periodically observes a dynamic complex system which is influenced, at the time of observation, by a decision. This decision is made among a set of possible actions, namely the set of entities which can be tested in a given state of the complex system. In other words, the evolution of the complex system is the result of the interaction, over time, of random transition laws of the complex system and the choice of a sequence of actions performed by the maintenance operator.

The inventors have identified that such a troubleshooting procedure can be modeled by a Markov decision process. Indeed, Markov decision processes are an approach to optimization which is used to solve sequential decision-making problems, at each time increment, in an uncertain environment; this corresponds to the problem identified by the inventors. Markov decision processes enable calculating a policy that gives the action to be put into place according to the state of the system. The invention proposes combining the fault tree technique with a Markov decision process. It does so in order to determine, in an optimal manner, the sequence of troubleshooting actions which allow quickly handling the consequences of a failure and ensuring maintainability of the complex system.

Figure 1:
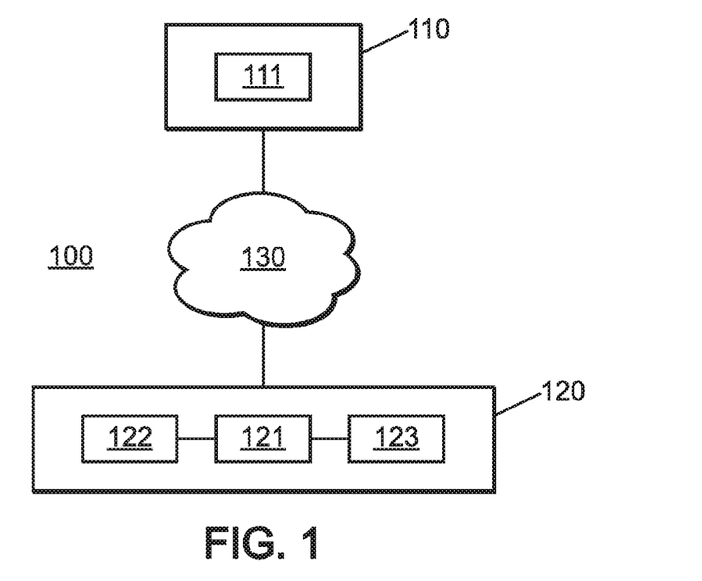
FIG. 1 shows a system for assisting with troubleshooting a complex system according to the invention.

FIG. 1 illustrates a system 100 for assisting with troubleshooting a complex system (not shown). The system 100 comprises a troubleshooting assistance server 110 and a portable electronic device 120, both of which are arranged for accessing a communication network 130. In one particular implementation, the system 100 comprises a plurality of troubleshooting assistance servers 110 and/or a plurality of portable electronic devices 120. In one implementation, the electronic device 120 is not portable. In another implementation, the troubleshooting assistance server 110 and the electronic device 120 are comprised in the same computer device.

The troubleshooting assistance server 110 comprises a first processor 111 configured for at least partially executing a method for assisting with troubleshooting a complex system. The method will be described below with reference to FIG. 2. For the time being, it is sufficient to remember that the method according to the invention is capable of determining an optimal sequence of troubleshooting actions for the complex system.

The portable electronic device 120 comprises a second processor 121 coupled to a user input device 122 and to a display device 123. In one particular implementation, the user input device 122 is comprised in the device display 123. In one example of this implementation, the display device 123 is a screen comprising a touch panel on all or part of a display surface of the screen.

In the example of FIG. 1, the second processor 121 is configured for receiving some or all of the optimal sequence of troubleshooting actions for the complex system, via the communication network 130. As indicated above, the optimal sequence of troubleshooting actions for the complex system is determined by the first processor 111 of the troubleshooting assistance server 110. In addition, the second processor 121 is configured for displaying on the display device 123 an image representative of the current troubleshooting action to be performed by a maintenance operator, based on the optimal sequence of troubleshooting actions for the complex system. In one example, the image representative of the current troubleshooting action to be performed contains text and/or symbols which mention the current troubleshooting action to be performed.

The second processor 121 is also configured for detecting an input signal from the user input device 121, which is representative of a user input during the displaying of the image representative of the current troubleshooting action to be performed. In response to a user input which is indicative of detection, by a maintenance operator of the complex system, of a failure or confirmation of the proper operation of the entity associated with the current troubleshooting action to be performed, the second processor 121 is configured to display on the display device 123 an image representative of the next troubleshooting action to be performed, based on the optimal sequence of troubleshooting actions for the complex system.

The system 100 according to the invention has the effect that the maintenance operator of a complex system is no longer required to test the potentially failed entities of the complex system, in an arbitrary order. Indeed, according to the invention, a first troubleshooting action to be performed on the complex system is first of all determined at the troubleshooting assistance server 110. Next, the following troubleshooting action to be performed by the maintenance operator is displayed on the portable electronic device 120 according to the result observed after the previous troubleshooting action on the current entity by the maintenance operator. Finally, the set of troubleshooting actions is included in the optimal sequence of troubleshooting actions for the complex system.

In one particular implementation of the system 100, the second processor 121 of the portable electronic device 120 is further configured for sending the user input to the first processor 111 of the troubleshooting assistance server 110 via the communication network 130. Then, in response to receiving the user input, the first processor 111 is further configured for determining the next troubleshooting action from the optimal sequence of troubleshooting actions for the complex system to the portable electronic device second processor.

This particular implementation has the effect of reducing the number of calculations required to determine the optimal sequence of troubleshooting actions to be performed. In fact, in this implementation, the calculations are carried out as the troubleshooting is performed by the maintenance operator of the complex system.

Figure 2:
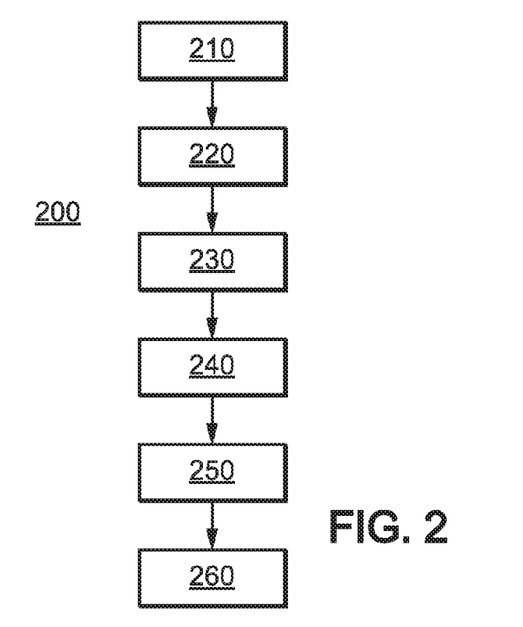
FIG. 2 shows a method for assisting with troubleshooting a complex system according to the invention.

FIG. 2 illustrates a method 200 for assisting with troubleshooting a complex system according to the invention, as mentioned above.

As indicated above, the complex system is considered to be modeled by a fault tree defining some or all of the combinations of events causing a top event associated with a failure of the complex system. In this context, the fault tree comprises a plurality of intermediate events and a plurality of basic events. In the invention, the basic events of the augmented fault tree are considered to be independent.

Figure 3:
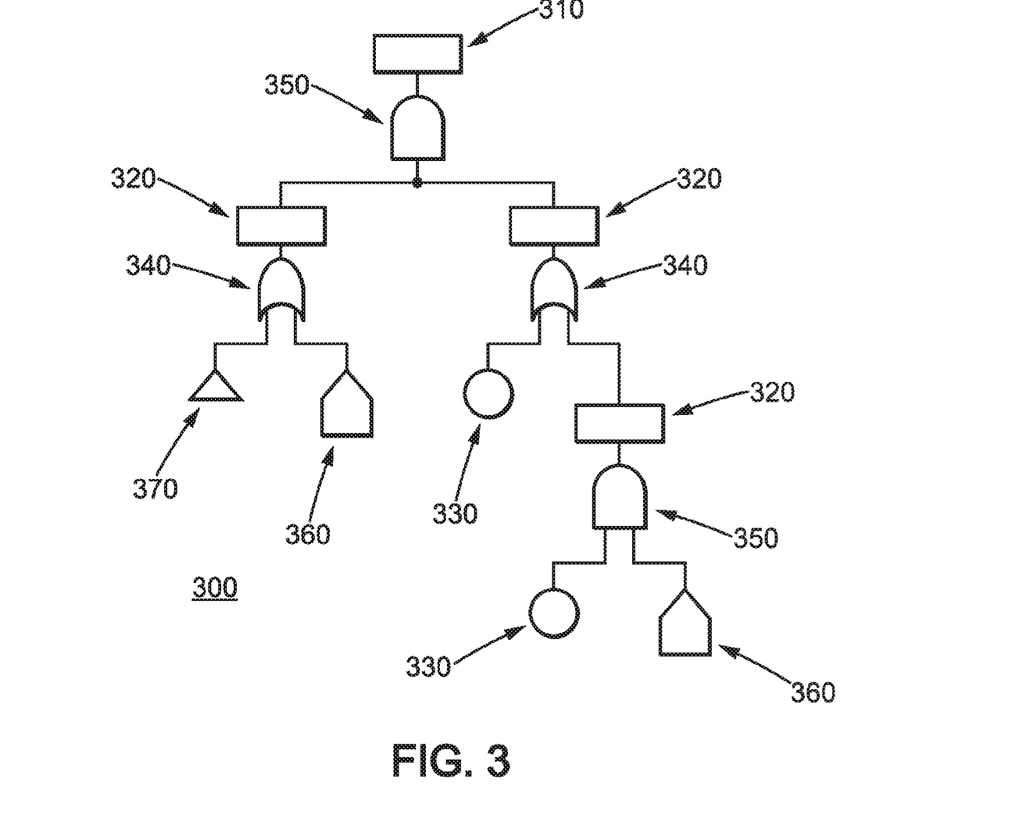
FIG. 3 shows a fault tree.

FIG. 3 illustrates an example of a fault tree 300. The symbols used to represent a fault tree are standardized as proposed by the NF EN 61025 standard "Analyse par arbre de pannes" (for the English version, IEC 61025 "Fault tree analysis"). A fault tree can be represented in the form of a file, as proposed for example by the Open PSA Initiative organization ("Open Probabilistic Safety Assessment Initiative"; https://open-psa.github.io). In the Open PSA format example, it is a file in extensible markup language (XML).

Thus, in the example of FIG. 3, we can find in a fault tree such as fault tree 300, a top event 310, intermediate events 320, basic events 330, OR connectors 340, and AND connectors 350. Events 310, 320 are represented by rectangles which contain the labels for these events. The top event 310 and the intermediate events 320 are broken down into a combination, such that under the box which represents them we find the symbol of the connector 340, 350 which links the events whose combination is necessary and sufficient to cause it. Basic events 330 or conditions 360 do not break down further, so immediately under the box which represents them we find a particular symbol: a circle for basic events and a pentagon (in the shape of a house) for conditions. The triangle symbol 370 links one page to another. Thus, the triangle symbol 370 is placed under an intermediate event for which the breakdown will begin on another page, where this event will appear at the top. The symbol of the OR connector 340 is distinguished from the symbol of the AND connector 350 by its upwardly curving concave base while the other has a straight, horizontal base. Of course, other elements not mentioned here may also be part of the fault tree 300 depending on the standard used.

Returning to the method 200 of FIG. 2, in step 210 an a priori probability of occurrence value is assigned to each of the basic events of the fault tree, in order to generate an augmented fault tree. For example, with the Open PSA format, it may involve creating a new XML attribute in the file describing the fault tree.

It is known that the a priori probability of occurrence value of a failure is considered equivalent to its estimated future frequency of occurrence in the complex system. The a priori probability of occurrence value is generally different from the historical frequency and may deviate, for a given complex system, from the average probability of occurrence evaluated across a set of similar complex systems. In other words, the probability of occurrence can be seen as the probability that a failure has occurred between a first time (for example, the commissioning of the complex system or the last complete reconditioning of the complex system) and a second time, called the task time, corresponding to step 210.

In one particular implementation of step 210, the a priori probability of occurrence value is obtained from a distribution function characterizing the law of failure probability specific to each basic event of the fault tree.

In one example, the law of failure probability for a given basic event is an exponential law such that its distribution function is described by the following formula:

$$Q(t) = \begin{cases} 1 - e^{-\lambda t} & \lambda \geq 0 \\ 0 & \lambda < 0 \end{cases}, \quad (1)$$

where t represents the time and $\lambda$ is the intensity parameter of the exponential law representing a failure rate. In this example, t may be initialized to the task time, as mentioned above.

In another example, the law of failure probability is a statistical law chosen from a group composed of the exponential law, the normal law, the log-normal law, Weibull's law, the gamma law, and combinations thereof.

In one particular implementation of step 210, the a priori probability of occurrence value may be estimated or updated from data observed in the physical world (e.g. feedback) by the maintenance operator.

Next, in step 220, failure information is assigned to each of the basic events and each of the intermediate events of the augmented fault tree which are associated with an entity under automatic monitoring. As mentioned above, this may involve creating a new XML attribute in the file describing the augmented fault tree. In the invention, an entity is "under automatic monitoring" when there is a means for observing the operating state of this entity. The means for observing the operating state of the entity may be human means (the eyes of the maintenance operator for example) or automatic means (an electronic monitoring device for example). In the invention, the failure information is considered to describe an observation of the operating state of the entity associated with the event of the augmented fault tree.

In one example, the failure information is binary. In this example, a first binary state indicates that the intermediate event concerned has failed while a second binary state indicates that the intermediate event concerned is operating normally.

In one particular implementation of step 220, the failure information is received from one or more fault sensors associated with one or more entities.

Next, in step 230, an ex-post probability of occurrence value is calculated for each of the events of the augmented fault tree, from the assigned a priori probability of occurrence values and the assigned failure information. To do this, one can make use of probability theory. In addition, to take into account the fact that an entity under automatic surveillance has or has not failed, it will also be necessary to be able to determine the conditional probability of an event, knowing that another event has or has not occurred.

In one particular implementation of step 230, a Bayesian network is constructed from the augmented fault tree and the probability value is calculated based on the Bayesian network.

Indeed, it is known that a fault tree whose basic events are associated with simple probabilities is a particular case of a Bayesian network (on this subject, see for example M. Bouissou, 2008, "Gestion de la complexité dans les études quantitatives de sûreté de fonctionnement de systémes" (Managing complexity in quantitative studies of system dependability), Eyrolles; M. Bouissou, 2000, "Deux méthodes originales pour calculer les performances d'un système possédant des états de fonctionnement dégradé" (Two original methods for calculating performance of a system having degraded operating states), 12ème congrès de fiabilité et maintenabilité (12th Reliability and Maintanability Symposium), Montpellier, 2000; A. Bobbio, L. Portinale, M. Minichino, E. Ciancamerla, 2001, "Improving the analysis of dependable systems by mapping fault trees into Bayesian networks", Reliability Engineering & System Safety, Volume 71, Issue 3, March 2001, pages 249-260).

In this particular implementation, the Bayesian network is intended to make predictions concerning relationships between events of the augmented fault tree, based on failure information and a priori probability values. To do so, the nodes of the Bayesian network represent corresponding entities of the complex system. In addition, the arcs between nodes are associated with conditional probability distributions which represent probabilities of events associated with some of the entities of the complex system which are associated with events associated with other entities of the complex system.

In step 240, a troubleshooting cost is assigned to each of the events of the augmented fault tree which are associated with an entity which is not under automatic monitoring and which is serviceable. In the invention, an entity is said to be "serviceable" if the maintenance operator is able to access it to determine whether or not the entity has failed. In the invention, the troubleshooting cost is considered to define the difficulty for the maintenance operator in identifying the failure of the entity associated with the event of the augmented fault tree. In other words, the troubleshooting cost is a loss related to the difficulty of determining whether an entity has failed. For example, the troubleshooting cost can serve to define the difficulty for the maintenance operator in physically accessing the potentially failed entity.

In the invention, following an action by the maintenance operator to troubleshoot an entity, it is considered that the possible evolution of the complex system will be accompanied by measurable economic effects. It was thus chosen to define the troubleshooting cost as an economic criterion which makes it possible to compare the measured effects, in order to choose actions which control the troubleshooting of the complex system in an optimal manner. The troubleshooting cost therefore makes it possible to measure the economic effect of a given troubleshooting action in a given state of the complex system. The problem thus solved by the invention consists of determining a sequence of troubleshooting actions to be carried out in order to minimize the anticipated total economic effect, knowing the probability distribution of the initial state of the complex system.

In one particular implementation of step 240, the troubleshooting cost is obtained based on a cost function dependent on at least one term which corresponds to a measurement or an estimate of the difficulty for the maintenance operation in identifying the failure of the entity. For example, the cost function is chosen from a group composed of a piecewise linear function, an exponential function, and combinations thereof. In addition, for example, the term of the cost function is chosen from a group composed of the time required to troubleshoot the entity, the number of people required to troubleshoot the entity, the monetary cost necessary to troubleshoot the entity, the difficulty of access in order to troubleshoot the entity, and combinations thereof.

In step 250, using a Markov decision process, we model one or more possible evolutions of the complex system, based on the augmented fault tree, in response to at least one troubleshooting action by the maintenance operator on at least one entity. According to the invention, the troubleshooting action is considered to correspond to a procedure of identifying the failure or confirming the proper operation of the entity.

As a reminder, a Markov decision process is a discrete stochastic verification process. At each step, the process is in a certain state s, and an agent chooses an action a. The probability that the process reaches state s' is determined by the action chosen. More precisely, it is described by the state transition function T(s,a,s'). Therefore, state s' depends on the current state s and on the action a selected by the decision maker. However, for s and a, the next state is independent of the previous states and actions. We then say that the process satisfies the Markov property. Finally, when the process changes from state s to s', the agent gains a positive or negative reward R(s,a,s').

In one particular implementation of step 250, the Markov decision process is defined with a finite horizon described by a quadruplet {S,A,T,R} in which:

S is a set defining the states in which the complex system can be found at time t starting from an initial state of the complex system, A is a set defining the troubleshooting actions that can be performed as a function of the state of the complex system and which influence the evolution of the current state of the complex system, T is a transition function defining the set of probabilities of transitioning between two states of the complex system at states t and t+1, in response to the troubleshooting actions of set A. In one implementation of the invention, T(s,a,s') corresponds to the probability of changing to state s' when action a is carried out in state s and the entity associated with action a is considered to have failed. Thus, in this implementation, T(s,a,s') is a failure probability, R is a reward function defining the set of troubleshooting costs associated with the troubleshooting actions of set A. In the invention, the reward is negative and therefore corresponds to a cost. R(s,a,s') is thus the perceived cost after having carried out action a in state s which leads the system to state s'.

Figure 4:
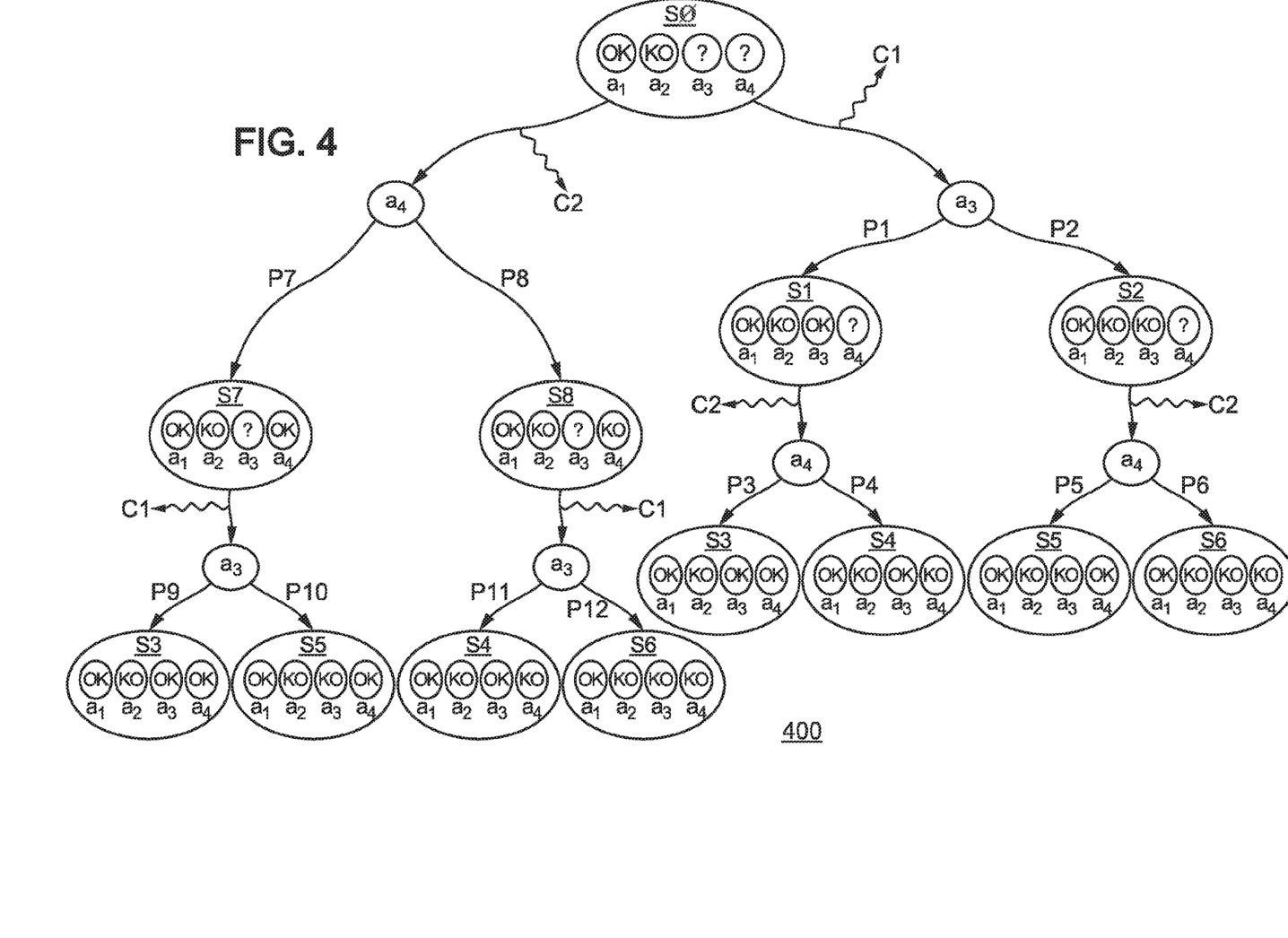
FIG. 4 shows a Markov decision process.

FIG. 4 illustrates a Markov decision process 400 which models the evolution of a complex system during troubleshooting, according to a Markov dynamic. The exemplary Markov decision process 400 will now be described using the abovementioned formalism.

The set S of the Markov decision process 400 is defined according to the following formula:

$$S=\{S0,S1,S2,S3,S4,S5,S6,S7,S8,S9,S10,S11,S12\} \quad (2),$$

in which state S0 represents the initial state of the complex system at time t=0. In one particular implementation, t is initialized to the moment when troubleshooting of the complex system begins. In the example of FIG. 4, states S1 and S2 can be reached, starting from state S0, under the influence of action a3.

Set A of the Markov decision process 400 is defined according to the following formula $$A=\{a1,a2,a3,a4\} \quad (3),$$

in which the indices 1, 2, 3, 4 refer to an entity of the complex system. Thus, action a1 corresponds to the troubleshooting action associated with entity 1 of the complex system. In the example of FIG. 4, in a given state of set S, a troubleshooting action which has concluded that the entity concerned is working properly is represented by a circle containing the text "OK". Conversely, a troubleshooting action which has concluded that the entity concerned has failed is represented by a circle containing the text "KO". Finally, a troubleshooting action that has not yet been undertaken is represented by a circle containing a question mark. Thus, in FIG. 4, state S0 describes the following situation:

entity 1 is considered to be functioning correctly,
entity 2 is considered to have failed, and
entities 3 and 4 have not yet been tested.

Set T of the Markov decision process 400 is defined according to the following formula:

$$T=\{p1,p2,p3,p4,p5,p6,p7,p8,p9,p10,p11,p12\} \quad (4).$$

In the invention, a probability p of the transition function T corresponds to the probability that the tested entity has failed. By assigning an a priori probability of occurrence value to each of the basic events of the augmented fault tree associated with the complex system, it is possible to determine the probabilities pi. These probabilities correspond to conditional probabilities defined according to the following formula:

$$T(s,a,s')=P(X_{t+1}=s'|X_t=s,A_t=a) \quad (5)$$

Thus, in the example of FIG. 4, probability p6 is obtained by calculating the conditional probability that entity 4 is has failed, knowing that the previous state is S2. In mathematical form, the calculation can be formulated as follows:

$$p6=(X_{t+1}=S6|X_t=S2,A_t=a4)=P(S6|S2,a4) \quad (6)$$

For this calculation, we can use a Bayesian network as mentioned above.

Set R of the Markov decision process 400 is defined according to the following formula: R={c1,c2} (6). In the example in FIG. 4, c1 corresponds to the cost associated with carrying out action 3, and c2 corresponds to the cost associated with carrying out action 4.

In step 260, an optimal sequence of troubleshooting actions for the complex system is successively determined, according to a decision policy which minimizes the expected value of the sum of the troubleshooting costs and which is determined by applying a Markov decision process solving algorithm. In the invention, the expected value of a troubleshooting cost associated with an action is defined as the product of the probability of transition under the influence of the action and the troubleshooting cost associated with this action. Thus, the decision policy obtained by solving the Markov decision process will provide the troubleshooting action to be taken in all states of set S which are successively observed following the results of the preceding troubleshooting actions. However, it is also envisaged to use algorithms in which the decision policy obtained by solving the Markov decision process will provide the set of troubleshooting actions to be performed in all states that set S could theoretically take.

By solving the Markov decision process, we obtain a policy which indicates the optimal action to take in each state of the complex system. Consequently, with a single policy, the sequence of actions that will ultimately be chosen will depend on the actual evolution of the process.

In one example, the Markov decision process solving algorithm is chosen from a group composed of value iteration, Q-Learning, SARSA, UCT, Dynamic Programming, Policy Iteration, and Temporal Difference Learning.

In a first particular implementation (not shown), a terminal state of the Markov decision process is determined where the taking of actions is stopped. In other words, in the terminal state of the Markov decision process, the method 200 no longer provides the maintenance operator with actions to be carried out. This implementation has the effect of encouraging a rapid return to a stable state of the complex system.

In this particular implementation, we consider the case where T defines the set of failure probabilities, as indicated above.

In this case, a terminal state of the Markov decision process is considered to be reached when the current state of the Markov decision process satisfies the following condition(s), taken alone or in combination:
- a basic event is identified as having failed. This will be the case, for example, when at least one failure probability of a basic event is equal to 1;
- all basic events are identified as not having failed. This will be the case, for example, when all the failure probabilities are equal to 0; and
- no troubleshooting action can be performed. This will be the case, for example, when all the serviceable nodes of the complex system have a failure probability equal to 0 or 1.

The invention claimed is:

1. A method for assisting with diagnosis of a complex system comprising a plurality of mechanical, electric, electronic and/or software components connected to each other, each among a portion of the components being associated with one or more fault sensors, the method, implemented by a processor, comprising:
   receiving a file containing a modeling of some or all of the complex system by a fault tree defining some or all of combinations of events causing a top event associated with a failure of the complex system, the fault tree comprising a plurality of intermediate events and a plurality of basic events,
   assigning an a priori probability of occurrence value to each of the basic events of the fault tree, in order to generate an augmented fault tree,
   assigning failure information to each of the basic events and each of intermediate events of the augmented fault tree which are associated with a component under automatic monitoring, the failure information being obtained from fault sensors and describing an observation of an operating state of the component associated with the basic event of the augmented fault tree,
   calculating an ex-post probability of occurrence value for each of the basic events of the augmented fault tree, based on the assigned a priori probability of occurrence values and the assigned failure information,
   assigning a troubleshooting cost to each of the basic events of the augmented fault tree which are associated with a component not under automatic monitoring and serviceable, the troubleshooting cost defining a difficulty for a maintenance operator in identifying a failure of the component associated with the basic event of the augmented fault tree,
   modeling, by a Markov decision process, MDP, based on the augmented fault tree, one or more possible evolutions of the complex system in response to at least one troubleshooting action by the maintenance operator on at least one component, the troubleshooting action corresponding to a procedure for identifying the failure of the component or confirming the proper operation of the component,
   determining an optimal sequence of troubleshooting actions for the complex system, according to a decision policy which minimizes an expected value of a sum of the troubleshooting costs and which is determined by applying an MDP-solving algorithm.

2. The method according to claim 1, wherein the step of calculating an ex-post probability of occurrence value comprises the steps of:
   constructing a Bayesian network from the augmented fault tree, the Bayesian network being provided for making predictions concerning relationships between events of the augmented fault tree based on failure information and a priori probability values, and
   calculating a probability value from the Bayesian network.

3. The method according to claim 2, wherein nodes of the Bayesian network represent corresponding components of the complex system, wherein arcs between nodes being associated with distributions of conditional probabilities which represent probabilities of events associated with certain components of the complex system which are associated with events associated with other components of the complex system.

4. The method according to claim 1, wherein the step of assigning a troubleshooting cost comprises the step of:
   obtaining the troubleshooting cost from a cost function dependent on at least one term which corresponds to a measurement or an estimate of the difficulty for the maintenance operator in identifying the failure of the component.

5. The method according to claim 1, wherein the step of modeling by an MDP comprises the step of defining an MDP with a finite horizon described by a quadruplet $\{S, A, T, R\}$ in which:
   S is a set defining states in which the complex system can be found at time t starting from an initial state of the complex system, A is a set defining the troubleshooting actions that are configured to be performed as a function of state of the complex system and which influence evolution of a current state of the complex system, T is a transition function defining a set of probabilities of transitioning between two states of the complex system at states t and t+1, in response to the troubleshooting actions of set A, and R is a reward function defining a set of troubleshooting costs associated with the troubleshooting actions of set A.

6. The method according to claim 5, wherein, when T defines a set of failure probabilities, a terminal state of the MDP is reached when at least one failure probability of a basic event is equal to 1.

7. The method according to claim 5, wherein, when T defines a set of failure probabilities, a terminal state of the MDP is reached when the set of the failure probabilities is equal to 0.

8. The method according to claim 5, wherein, when T defines a set of failure probabilities, a terminal state of the MDP is reached when all of serviceable nodes of the complex system have a failure probability equal to 0 or 1.

9. A computer program product comprising a non-transitory computer-readable medium including instructions which, when executed by a processor, configure the processor to implement the steps of the method according to claim 1.

10. A system for assisting with diagnosis of a complex system comprising a plurality of mechanical, electric, and/or software components connected to each other, each among a portion of the components being associated with one or more fault sensors, the system comprising a diagnosis assistance server and an electronic device both of which are arranged for accessing a communication network:

the diagnosis assistance server comprises a first processor configured to at least partly execute a method according to claim 1, based on a file containing a modeling of some or all of the complex system by a fault tree defining some or all of combinations of events causing a top event associated with a failure of the complex system, the fault tree comprising a plurality of intermediate events and a plurality of basic events, the electronic device comprises a second processor coupled to a user input device and to a display device, in which the second processor is configured for:

receiving all or part of an optimal sequence of troubleshooting actions for the complex system, via the communication network, displaying on the display device an image representative of a current troubleshooting action to be performed, based on the optimal sequence of troubleshooting actions for the complex system, detecting an input signal from the user input device, which is representative of a user input during the displaying of the image representative of the current troubleshooting action to be performed, in response to a user input which is indicative of detection of a failure or confirmation of a proper operation of a component, and associated with the current troubleshooting action to be performed, displaying on the display device an image representative of a next troubleshooting action to be performed, based on the optimal sequence of troubleshooting actions for the complex system.

11. The system according to claim 10, wherein:

the second processor of the portable electronic device is further configured for sending the user input to the first processor of the diagnostic assistance server, in response to receiving the user input, the first processor is further configured for:

determining the next troubleshooting action from the optimal sequence of troubleshooting actions for the complex system, and sending the next troubleshooting action, from the optimal sequence of troubleshooting actions for the complex system to the second processor of the portable electronic device.

12. The system according to claim 10, wherein the user input device is comprised in the display device.

* * * * *